A. SPEAR, DEC'D.
M. B. SPEAR, EXECUTRIX.
SPEED CHANGING AND CONTROLLING DEVICE.
APPLICATION FILED MAR. 11, 1913.

1,121,413.

Patented Dec. 15, 1914.
4 SHEETS—SHEET 1.

UNITED STATES PATENT OFFICE.

ARTHUR SPEAR, OF BROOKLYN, NEW YORK; MYRTLE B. SPEAR EXECUTRIX OF SAID ARTHUR SPEAR, DECEASED.

SPEED CHANGING AND CONTROLLING DEVICE.

1,121,413.   Specification of Letters Patent.   Patented Dec. 15, 1914.

Application filed March 11, 1913. Serial No. 753,479.

*To all whom it may concern:*

Be it known that I, ARTHUR SPEAR, a citizen of the United States, and a resident of Brooklyn, in the county of Kings and State of New York, have invented certain new and useful Improvements in Speed Changing and Controlling Devices, of which the following is a specification.

The invention relates to devices and improvements for controlling the change speed gear of mechanism in which a transmission or like mechanism is interposed between the engine and the driven part to vary their relative speed, such as of automobiles and like machines.

Objects of the invention are to provide novel mechanism for automatically changing the speed; to provide for automatically and settably controlling the speed changing means and actuating means for the speed changing mechanism; to provide novel mechanism and devices or instrumentalities for effecting this; to provide for selectively and settably controlling the speed changing mechanism; to provide novel selectively operated as distinguished from positionably operated means for effecting the same; to provide fluid pressure operation and also fluid pressure control for the speed changing means and to provide novel mechanisms for effecting the same; to provide automatic clutch actuation and control and also suitable brake actuation and control; and novel mechanisms for effecting these functions and objects; and to provide further novel mechanisms and instrumentalities for these purposes and coöperating with the functions and instrumentalities pointed out herein. These and other objects of invention will in part be obvious and will in part more fully appear herein.

The invention consists in the novel parts, mechanisms, combinations, arrangements, improvements and instrumentalities, herein shown and described.

The accompanying drawings, referred to herein and forming a part hereof, illustrate one embodiment of the invention, the same serving in connection with the description herein to explain the principles of the invention.

Fig. 5ª is an elevation looking at Fig. 5 from the right.

Referring to the accompanying drawings, illustrating by way of example one embodiment of the invention, the same is shown applied to a well known type of speed changing device in which the gears are shifted into and out of engagement to effect the requisite and desired changes in speed. The particular mechanism of the transmission is not illustrated in detail, but is shown inclosed in a casing 1. The gears are shifted in effecting the speed changes by means of movable members shown herein as sliding rods 2, 3 and 4. These rods are connected to the slidable or shiftable gears within the casing to slide or shift them to and fro as may be necessary to effect the speed changes.

The movable slidable members or rods 2, 3 and 4 are located side by side so that their moving device, such as the arm 10, may pass from one to the other, and are each provided with means adapted to be engaged by such selecting and moving means adapted to move or slide any selected one of said members to and fro for the purpose stated. Said moving means is constructed so that it may move into operative relation with either one of the slidable members or rods, and from one to the other of them so as to select the proper or desired rod and to then move it in the desired direction.

Figure 6:
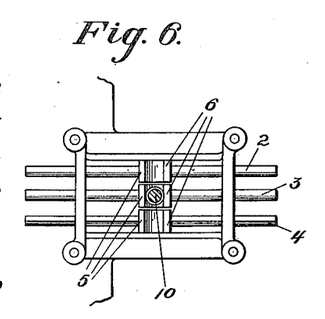
Fig. 6 is a section on the line G—H of Fig. 3.

The embodied form of engaging device on the slidable rods comprises two parallel lugs or lips 5 and 6 between which the actuating device therefor slides from one of the rods 2, 3 and 4 to another, and against which said device presses in sliding the rods in one direction or the other. These engaging devices 5 and 6 are in alinement with each other, as shown in Figs. 3 and 6, when the moving means therefor is in what for convenience of language may be termed the initial or neutral position.

There is provided by my invention means operating automatically under the control of suitable settable devices for moving or sliding the rods 2, 3 and 4 to effect the desired changes in speed, and which automatically pass into and out of engagement with the various rods as desired, but it will be understood that so far as concerns many aspects of the invention, said automatic actuating means is adapted to operate with gear actuating connections other than slidable rods.

The moving device which coöperates directly with the slidable rods 2, 3 and 4 in the present embodiment comprises an arm 10 mounted to slide and also to rock on a shaft 11 carried on a suitable support such as brackets 12 and 13, the end of said arm 10 engaging slidable rods 2, 3 and 4 between the lugs 5 and 6. As embodied the rocking movement carries the arm from one slide to another and the sliding movement of arm 10 on its support 11 effects the sliding movement of rods 2, 3, and 4.

Figure 1:
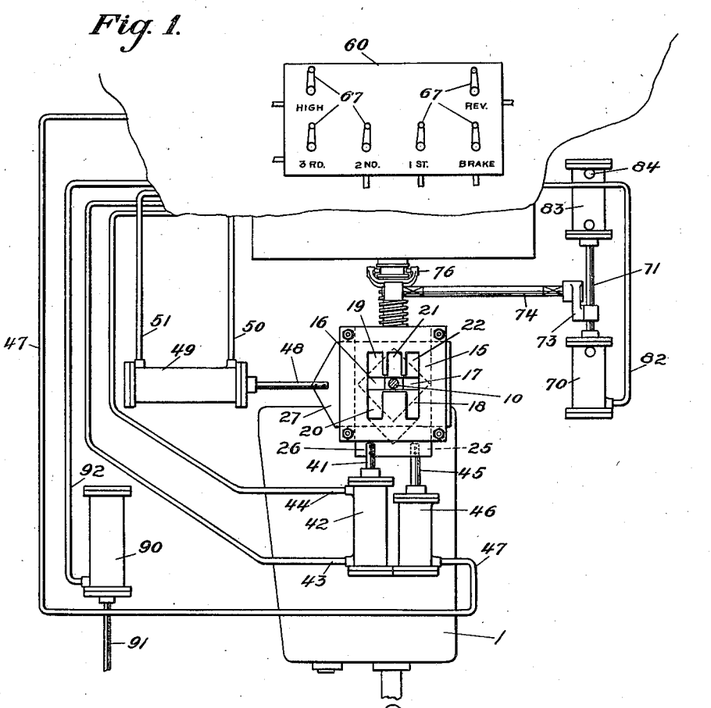
Figure 1 is a plan view, partly diagrammatic, of a mechanism embodying my invention as applied to an automobile engine.
Figure 2:
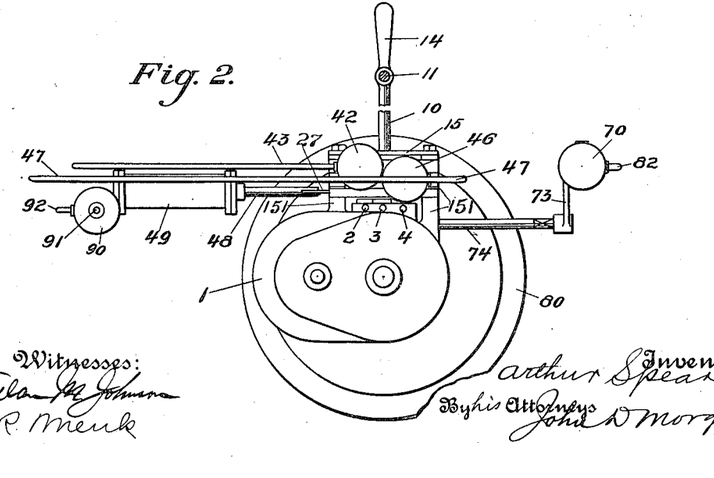
Fig. 2 is an elevation looking at Fig. 1 from the bottom and at Fig. 3 from the left (with the near bracket at the top of the figure in Fig. 3 cut away)
Figure 3:
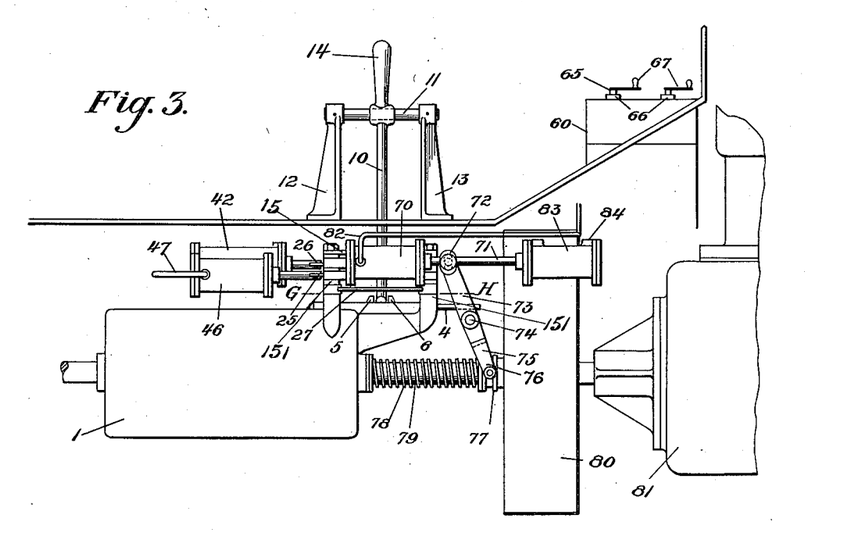
Fig. 3 is an elevation looking at either Figs. 1 or 2 from the right but showing the arm 10 and its supports in full.

The automatic devices which in the embodied form effects the selecting action, that is, moves the arm 10 into engagement with one of the slidable rods or the other thereof and which then moves the arm and selected rod to effect the gear change are located just above or adjacent to said slidable rods as best appears from Figs. 2 and 3, and comprises a plurality of guiding and actuating members moving relatively to each other and adapted to move the arm 10 and thereby the slidable rods 2, 3 and 4. There is also provided a suitable handle 14 fixed to arm 10, if desired, by which the speed changes may be manually effected. As embodied said automatic devices comprise guiding and actuating means. The guiding means as embodied comprises a fixed guide plate 15 (see especially Figs. 1, 4 and 11) provided with guiding means in the form of an opening 16 through which the arm 10 passes, the opening 16 being so shaped that the arm 10 will always move in the right direction to effect the speed change or gear shift desired. (This relation of the parts is shown in Fig. 1). In such embodied form it is suited for a machine having four speed changes, together with the reverse and the initial position. The arm 10 travels in the opening or slot 16. Coöperating with said arm and guiding means are the actuating means, comprising a plurality of actuators, which in accordance with certain features of the invention are successively actuable. That is, one actuator operates in conjunction with the guiding means and then another to give the requisite throw out of one gear connection and the throwing in of another. In certain aspects of the invention also they are fluid pressure operated. In the embodied form said means comprises a plurality of slides each having an opening therein through which the arm 10 also passes as well as through the guide plate. The openings in said guide plates are formed so that in coöperation with the guide plate and being operated or actuated in proper sequence, the shift of the gears from one speed to another is effected through the movement of arm 10.

The staff 10 in the portion 17 of slot 16 travels to and fro in what, for convenience of language, may be termed the transverse direction whereby it passes into or out of engagement with any one of the rods 2, 3 or 4 as desired, during which movement it rocks upon the shaft 11. It also travels in what for convenience of language may be termed the longitudinal direction into and out of slots 18, 19, 20, 21 or 22 during which movement it slides on shaft 11. It will thus be seen that in passing from one position of the slidable rods and of the gears to another position thereof, the arm 10 must return to or pass through the slot 17, which corresponds to the initial position and to the neutral or initial position for the gear shift. It will be also understood that the movable members or slidable rods move to and from the initial position at which the arm 10 passes into or out of operation with a particular movable member or slidable rod, as desired.

In the embodied form of means are provided also actuating and guiding members coöperating with the foregoing instrumentalities and with the embodied form thereof for effecting the desired movements of the arm 10, these guiding and actuating members being actuated and controlled from settable means, which are set by the operator for the desired position of the speed changing devices or of the gears. In accordance with certain features of the invention these guiding and moving members are actuated by fluid pressure means and said settable means also operate by fluid pressure as provided by certain features of the invention. In the embodied form said means comprises a plurality of slidable plates already briefly referred to, said plates work in close proximity to the fixed guide plate 15. In the embodied form said guiding and moving plates are three in number and are designated by reference numerals 25, 26 and 27 and are slidable in guide ways formed in the support for fixed plate 15 (see Figs. 4, 5 and 6). These guiding and moving slides, as well as the guide plate 15 in the present embodiment are designed to give four speeds forward and the reverse in addition to the initial or disengaged position, and the particular conformation and construction thereof will be described in connection with the speed changing capacity or capability just mentioned. The slidable plate 26 is shown with a transverse slot 30 therein, which permits of relative movement of the arm 10 with respect to the slide 26 transversely, but the slide 26 and the arm 10 traveling together longitudinally, using those terms in the same sense of direction in which the plate 26 slides.

By consideration of the foregoing description and the drawings herewith, and referring especially to Fig. 1 of the drawings, it will be understood that the slide 26 with its transverse slot 30 is adapted to move the arm 10 into and out of each of the slots 18, 19, 20, 21 or 22 and to restore it to the initial position, that is, in the slot 17.

Figures 12, 13:
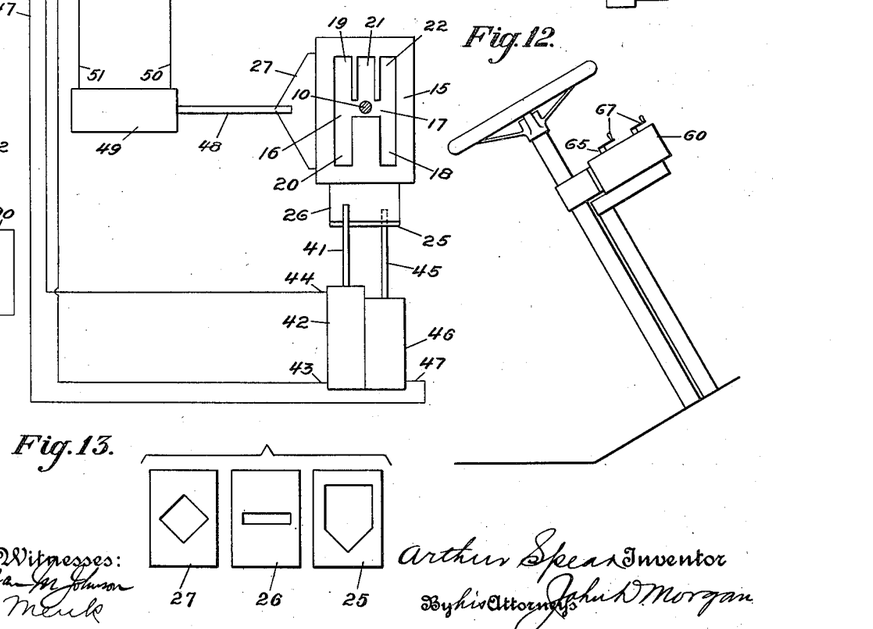
Fig. 12 is a fragmentary elevation showing the settable valve control mounted on the steering wheel support.
Fig. 13 is a plan detail of the actuator slides.

The sliding plate 25 has an opening 31 therein rectangular at the end 32 thereof, and diamond shaped at the end 33. The sliding plate 27 is provided with a diamond shaped opening 34 (see especially Fig. 13).

As embodied, the guide plate 15 is mounted above the actuator slides 25, 26 and 27, and all these are carried on a suitable supporting frame 151 just over the sliding rods 2, 3 and 4. The guide 15 is fixed upon said frame 151 and the actuators 25, 26 and 27 slide in grooves therein. These are arranged just under or in line with the mounting 11 for arm 10 (see Figs. 1, 2, 5 and 5ª), so that the arm 10 can pass through the guide plate and actuators and engage with the slidable rods 2, 3 and 4 and pass from one to the other and move any desired rod to and fro.

Figure 4:
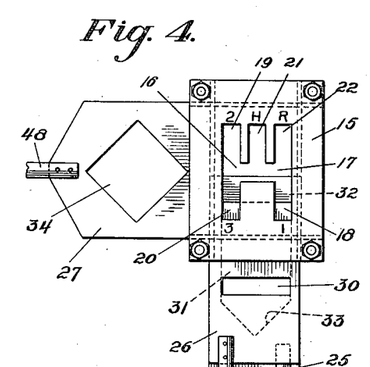
Fig. 4 is a top plan of the mechanism for actuating and controlling the gear shifting mechanism but showing some of the actuators partly withdrawn.
Figure 5:
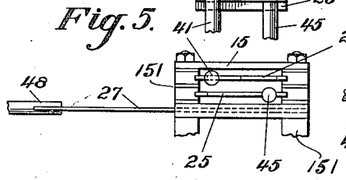
Fig. 5 is an elevation looking at Fig. 4 from the bottom.
Figure 5A:
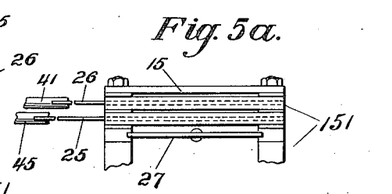

As a matter of convenience of illustration in Figs. 4 and 5 the slides are shown almost totally withdrawn from their mountings, but it will be understood that in the embodied device when assembled the arm 10 passes through each of these openings, as appears from Figs. 1 and 3 of the drawings.

In accordance with certain features of the invention, the slides 25, 26 and 27 are actuated and positioned by fluid pressure means, and in the embodied form thereof the slide 26 has attached thereto a piston rod 41 attached to a piston working in a cylinder 42. The cylinder 42 has a port at either end, one of said ports communicating with an air pipe 43 and the other communicating with an air pipe 44, the connections and control for which will be later described. The slide 25 has attached thereto a piston rod 45 with its piston working in a cylinder 46. The cylinder 46 in the present embodiment has a port at one end thereof connecting with an air pipe 47.

The slide 27 has a piston rod 48 with its piston working in a cylinder 49. The cylinder 49 has a port at either end, one of said ports communicating with a pipe 50 and the other communicating with a pipe 51.

Means are provided by the invention for controlling the air or other pressure fluid which moves the pistons in the cylinders 42, 46 and 49. In the embodied form thereof and in accordance with one feature of the invention, said means is selective, as distinguished from means which is positionable only. In the embodied form of such means there is provided a separate fluid pressure controlling device or valve for each of the positions of the speed changing mechanism; whereby in changing from one speed to another, an operator must select the device for effecting such change, instead of moving one controlling device from one position to another. Thus the possibility of a mistake is greatly lessened. Said fluid pressure controlling means as embodied are shown in the form of rotary valves, each one actuable by its own handle, and each has preferably a designating title thereon or adjacent thereto.

The general mechanism of the valve devices will next be described in connection with their coöperating parts. As embodied a fluid pressure chest 60 is provided adapted to receive a supply of compressed air or other fluid pressure through a supply pipe 61 from a suitable source. In the bottom 62 of said chest 60 are grooves and ports adapted to coöperate with rotary or other suitable valves, all of which will be described later in detail, together with the connections therefrom to the various cylinders 42, 46 and 49. Within the chest 60 and coöperating with said ports are a series of valves, and as embodied they are rotary disk valves having ports therethrough as later more fully described.

Figure 7:
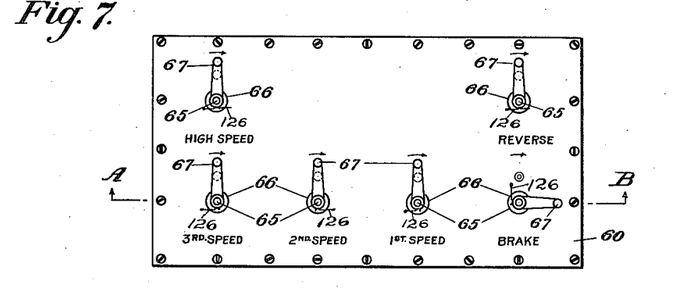
Fig. 7 is a top plan of the settable fluid pressure controlling means.

In Fig. 7 of the drawings is illustrated an arrangement of the various controlling valves for four speeds forward and reverse which are correspondingly lettered in the said figure, it being understood that the same is merely illustrative and a matter of convenience of construction and arrangement so far as concerns many features of the invention.

Describing generally the valve mechanism which controls the fluid pressure for the cylinders 42, 46 and 49, in the embodied form, a series of rotary valves are provided. Each valve consists of a disk 63 held to its seat upon the bottom 62 of the chest 60 by the pressure within the chest and preferably also by a spring 64 conveniently coiled about the stem 65 of the valve. The stem 65 projects from the face of the chest 60 through a suitable gland 66 and each valve stem is provided with a handle 67. Suitable ports are provided in the disks 63 which pass into and out of register with ports in their seats, as will be more fully described later.

A suitable relief or exhaust arrangement is provided in connection with each of the herein described valve mechanisms, the embodied form comprising a slot 68 of proper conformation opening on the lower face or seat of the valve and communicating by a passage 69 through the valve stem with the atmosphere either at the top or bottom of the chest.

Suitable means are provided for throwing in and out the clutch mechanism which connects and disconnects the engine and the transmission or change gear mechanism in proper and harmonious relation with the operation of the various speed changing mechanism. The embodied form of said means comprises a cylinder 70 in which works the piston rod 71. Connected to the piston rod 71 in a suitable manner, as by pin and slot connection 72, is an arm 73 fixed to a shaft 74. Fixed to said shaft 74 is an arm 75 engaging by a yoke 76 with a groove collar 77 on the clutch mechanism. Said clutch mechanism is held in engaging position by a spring 78 conveniently coiled about the shaft 79. The fly wheel is indicated generally by 80 and the engine casing by 81. The cylinder 70 is provided with a suitable port connecting by a pipe 82 with the fluid pressure chest and its valves as will be hereinafter described. An equalizing cylinder 83 having a suitable piston fixed on the piston rod 71 is provided, said cylinder having an equalizing relief valve 84.

There is provided also by the invention means for controlling the brake mechanism automatically in harmony with the setting of the speed changing devices and in accordance with certain features of the invention said mechanism is also operated by fluid pressure.

Each of the speed changing valves is provided with a suitable port 95 which communicates through port and slot 100 with the clutch shifting mechanism as already described in connection with the first speed position and mechanism.

The brake cylinder 90 has a piston rod 91 going to the brake mechanism, which mechanism is not shown. The cylinder 90 has a suitable port connecting to an air pipe 92. The brake mechanism has a clutch operating valve and a brake operating and controlling valve 96 and a corresponding port 97 in the chest 60, said port communicating with pipe 92.

Figure 8:
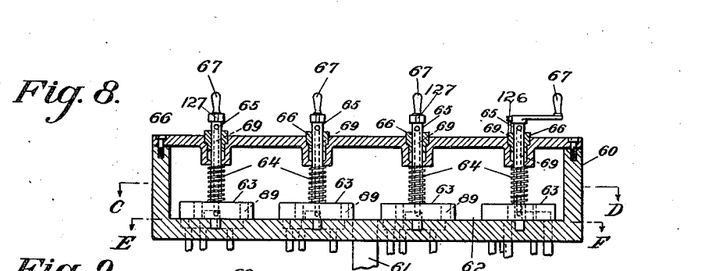
Fig. 8 is a sectional view on the line A—B of Fig. 7.
Figure 9:
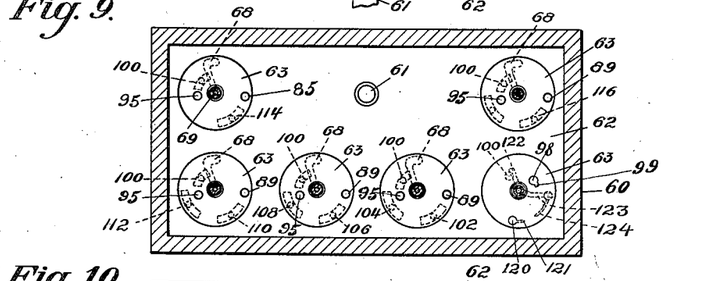
Fig. 9 is a sectional view on the line C—D of Fig. 8.
Figure 10:
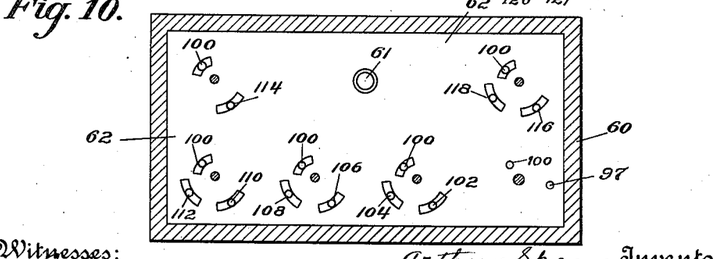
Fig. 10 is a sectional view on the line E—F of Fig. 8.
Figure 11:
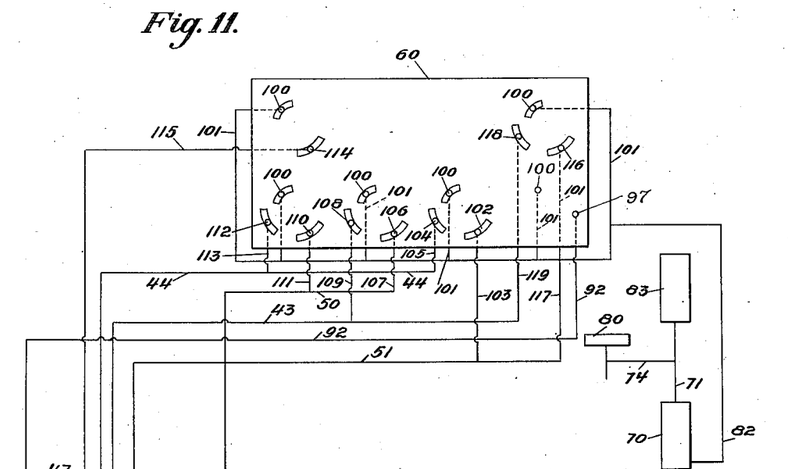
Fig. 11 is a diagrammatic view showing the fluid pressure connections for the actuating and controlling device.

Taking up now the embodied form of the valve and air pipe connections to the cylinders or from the various valves to the cylinders 42, 46 and 49 which operate the actuators or slide plates, and considering first, and by way of example and explanation, the connections for the first or lowest speed is so designated in Fig. 7 (by "1st speed" and in Fig. 4 by "1"), and shown in corresponding relative position in Figs. 8, 9 and 10 and in the diagrammatic view, Fig. 11, which figure will be considered in connection especially with Fig. 1. In Fig. 1 the various speeds and positions of the speed controlling or changing gears are indicated by lettering at the various valves and in Fig. 4, letters and figures for these speeds and positions are applied to the corresponding slots of guide plate 15 in which the arm 10 travels. Said valve has all ports closed when in its initial or rest position. It is moved in a clockwise direction bringing its port 95 into register with port and slot 100 communicating by a pipe 101 with the pipe 82 to the clutch actuating cylinder 70 for throwing out the clutch. Considering the valve as still being moved in a clockwise direction, referring to Figs. 7, 9 and 10, it would next coöperate with the port and slot 102 in the valve seat (see Fig. 10) which communicates by pipe 51 with cylinder 49 to move slide 27 to the right referring to Figs. 4 and 11. A third port and slot is provided in the valve seat numbered 104 and communicating by a pipe 105 with a pipe 44 which serves to move the slide 26 downwardly referring to Figs. 4 and 11 of the drawings. The valve 63 is provided with a port 89 therethrough adapted to coöperate with the slots and ports in the valve seat. Referring still to the valve control for the first position, and to Figs. 7, 10 and 11, the port 89 would next pass into operative relation with the port and slot 104.

Referring now, and also by way of example and explanation to the valve control for the second speed or second position of the gear changing mechanism, it will be noted that the first port and slot encountered in the clockwise movement of the valve, referring to Figs. 7, 10 and 11 are port and slot 106 communicating by a pipe 107 with pipe 50. This moves slide 27 to the left referring to Figs. 4 and 11. The next port and slot so coming into operative relation with the port 89 in the valve are port and slot 108, communicating by a pipe 109 with pipe 43. This moves slide 26 upwardly referring to Figs. 4 and 11.

Referring to the valve for the third speed, the port and slot 110 is first in operative relation with the port 89 of the valve, which port and slot communicate by pipe 111 with the pipe 50, which moves the slide 27 to the left as just described in connection with the second speed. The valve port 89 of the third speed valve comes next into operative relation with port and slot 112 communicating by pipe 113 with pipe 44 which moves slide 26 downwardly referring to Figs. 4 and 11 of the drawings.

Referring now to the high speed valve, this is provided in the present embodiment with a port and slot 114 connecting by a pipe 115 to a pipe 47 which moves slide 25 upwardly referring to Fig. 11 of the drawings.

Referring to the reverse valve, the port 89 thereof comes into operative relation first with a port and slot 116 connecting by pipe 117 with pipe 51 which moves slide 27 to the right referring to Fig. 11. Said valve during its further rotation has its port 89 communicate next with slot and port 118 which communicates by pipe 119 with pipe 43 which moves slide 26 upwardly referring to Fig. 11 of the drawings. By way of explanation, it may be further stated that in the present embodiment the valve ports and the ports or slots in the valve piece are so arranged that when the handles are in driving position all openings are closed. When any one of the valve handles 67 is turned from left to right, referring to Figs. 7, 10 and 11, the first port to receive the air or other pressure fluid is the port 100 which throws out the clutch, and the slide plates are then actuated and coöperate with the guide plate in the order necessary to move the gears from one position to another as desired. The pressure is cut off by the valve from one cylinder before it is turned on the next succeeding one so that the air pressure will not work against itself.

By way of illustration if it were desired to shift from the third speed position to reverse or to the first speed position, when the mechanism is in the third speed position, the arm 10 is in the end of the slot 20, being the bottom thereof, referring to Figs. 4 and 11, and the slide 27 has the lowermost angle of its opening (referred to Fig. 4) just beneath the end of slot 20 and the slide 26 is at the bottom of its travel referring to Figs. 4 and 11. When the first speed valve handle 67 is turned, the clutch is thrown out as already described, and the air is turned on at valve and port 102 moving plate 27 to the right causing arm 10 to travel upwardly in slot 20 to slot 17 and then across to the right in slot 17. The port and slot 102 are then cut off from the air pressure in chest 60 and are then relieved through slot 68. It will be understood also that the arm 10 has brought back its sliding rod when at slot 17 so that the end of the arm may travel across from one sliding rod to the other, the sliding rods being in alinement with each other at this time substantially as shown in Fig. 6. As the rotation of the first speed valve is continued, the air is next admitted to slot and port 104, which permitting the air to pass through pipe 44 moves slide 26 downwardly referring to Fig. 11, and the arm 10 is moved to the bottom or slot 18 referring to Fig. 11 and the corresponding sliding rod of the rods 2, 3 and 4 is moved to shift the gear correspondingly. This valve 104 is next relieved by the slot 68 and last of all the port 100 is relieved by the slot 68 and the clutch thrown in again. The rotation of the valve continues to a point where all the ports are again closed.

Detailed explanation of various shifts or changes from one speed to another will not be required in the light of the foregoing, but may be followed out from the description and the drawings.

A partial turn of a valve may be utilized to throw out the clutch and bring the gears to the neutral or initial position with the arm 10 in slot 17 and the sliding rods 2, 3 and 4 to initial position. If it be not desired to complete the shift corresponding to the particular valve, a turn of the valve backward past the starting point and then forward to the starting point will again throw in the clutch through relieving the pressure on the cylinder 70 through the relief slot 58 of the valve. The return of the valve handle at the starting point will thus leave the clutch thrown in, the gear mechanism at the neutral point, and all the ports of the chest 60 closed.

In shifting to the high speed, corresponding to the slot 21 but one port is required, the shift being made from the third speed to the highest by the upward movement of the plate 25 actuated by its cylinder 46 through the pipe 47 from the valve 114.

The embodied form of brake operating valve has a port 100 in the valve seat which serves to throw out the clutch in substantially the same manner as the other valves. The port 97 in the valve seat connects with pipe 92 to operate the brake cylinder and set the brake. In the valve disk 63 of the brake valve is a port 98 adapted to coöperate with the port 100 in the valve seat. This port 98 has an extension 99 which keeps the pressure on the clutch cylinder 70 for a longer period. Coöperating with port 97 is a port 120 in the valve disk which port has a very small extension 121 adapted to pass a very small quantity of air to apply the brake lightly and gradually. When the ports 120 and 97 are in register the full air pressure is on the brake. From the relief passage 69 there extends a relief duct 122 in the valve disk and also a relief duct 123 with an arcuate extension 124. With such embodied form the parts are normally in the position shown in Fig. 9 when the brake is off, the clutch cylinder port 100 in this disk, as in the others, being relieved through the passage 69 to the atmosphere. The brake valve handle in applying the brake is rotated counter clockwise from the position shown in Fig. 9 and the air pressure through ports 100 and 98 throws out the engine clutch, the clutch being held out by extension 99 during the continued rotation of the valve. The engine clutch is so positively held out when the end of arcuate extension 124 begins to communicate with port 97 and so remains when the full air pressure is on the brake through ports 97 and 120 being in register.

If it is desired to slow up the car gently without coming to a full stop a partial turn of the valve until it admits air to the small slot 121 only and then moving it back and forth will effect this result. If a quick and full application of the brake is desired, the port 120 may be at once turned into register with port 97. A stop may be employed if desired to limit the brake valve to a partial rotation.

A suitable positioning device for holding the valve handles at the starting point or in the inoperative position is provided, such as the springs 126 coöperating with notches 127 in the valve handles.

From all the foregoing it will be understood that devices have been provided realizing in embodied form the objects and advantages set forth herein, together with other objects and advantages.

The invention, in its broader aspects, is not limited to the particular constructions shown, nor to any particular constructions by which it has been or may be carried into effect, as many changes may be made in the construction without departing from the main principles of the invention and without sacrificing its chief advantages.

What I do claim as my invention and desire to secure by Letters Patent, is:

1. A speed changing and controlling device including in combination a plurality of members arranged side by side and separately movable to shift the transmission gears for different speeds, a device movable into operative relation with any of said members and adapted to move such member when in operative relation therewith, and a plurality of actuators for said movable device and means for causing said actuators by their joint action to actuate any one of said members, to effect a desired change in said gears.

2. A speed changing and controlling device including in combination a plurality of members arranged side by side and separately movable to shift the transmission gears for different speeds, a device movable into operative relation with any of said members and adapted to move such member when in operative relation therewith, and a plurality of actuators for said movable device, and means for causing said actuators by their joint action to actuate any one of said members to bring it into operative relation with any of said members and to move such member to effect a desired change in said gears.

3. A speed changing and controlling device including in combination a plurality of members separately movable to shift the transmission gears for different speeds, a device movable into operative relation with any of said members and adapted to move such member when in operative relation therewith, a plurality of actuators for said movable device, and settable means for controlling a plurality of said actuators, to effect a desired change in said gears.

4. A speed changing and controlling device including in combination a plurality of members separately movable to shift the transmission gears for different speeds, a device movable into operative relation with any of said members and adapted to move such member when in operative relation therewith, and a plurality of fluid pressure operated actuators for said movable device and means for causing said actuators by their joint action to actuate any one of said members to effect a desired change in said gears.

5. A speed changing and controlling device including in combination a plurality of members separately movable to shift the transmission gears for different speeds, a device movable into operative relation with any of said members and adapted to move such member when in operative relation therewith, a plurality of fluid pressure operated actuators for said movable device and settable means for controlling the action of the fluid pressure upon a plurality of said actuators to effect a desired change in said gears.

6. A speed changing and controlling device including in combination a plurality of members separately movable to shift the transmission gears for different speeds, a device movable into operative relation with any of said members and adapted to move such member when in operative relation therewith, and a plurality of actuators adapted to act in succession on said movable device, to effect a desired change in said gears.

7. A speed changing and controlling device including in combination a plurality of members separately movable to shift the transmission gears for different speeds, a device movable into operative relation with any of said members and adapted to move such member when in operative relation therewith, a plurality of actuators adapted to act in succession on said movable device and manually settable means controlling such successive action of said actuators to effect a desired change in said gears.

8. A speed changing and controlling device including in combination a plurality of members separately movable to shift the transmission gears for different speeds, a fluid pressure operated device movable into operative relation with any of said members and adapted to move such member when in operative relation therewith, and a plurality of actuators adapted to act in succession on said movable device to effect a desired change in said gears.

9. A speed changing and controlling device including in combination a plurality of members separately movable to shift the transmission gears for different speeds, a fluid pressure operated device movable into operative relation with any of said members and adapted to move such member when in operative relation therewith, a plurality of fluid pressure operated actuators adapted to act in succession on said movable device and manually settable means controlling such successive action of said actuators to effect a desired change in said gears.

10. A speed changing and controlling device including in combination a plurality of members separately movable to shift the transmission gears for different speeds, a device movable into operative relation with any of said members and adapted to move such member when in operative relation therewith, a plurality of actuators adapted to act in succession on said movable device, and manually settable means including a separately settable device for each speed for controlling such successive action of said actuators, to effect a desired change in said gears.

11. A speed changing and controlling device including in combination a plurality of members separately movable to shift the transmission gears for different speeds, a fluid pressure operated device movable into operative relation with any of said members and adapted to move such member when in operative relation therewith a plurality of fluid pressure operated actuators adapted to act in succession on said movable device and manually settable means including a separately settable device for each speed for controlling such successive action of said actuators, to effect a desired change in said gears.

12. A speed changing and controlling device including in combination a plurality of members arranged side by side and separately movable to shift the transmission gears for different speeds, an arm movable into and out of engagement with a selected member and guiding means and a plurality of actuators for so moving said arm and for moving said arm and selected member to shift the speed gear as desired.

13. A speed changing and controlling device including in combination a plurality of members arranged side by side and separately movable to shift the transmission gears for different speeds, an arm movable into and out of engagement with a selected member, and guiding means and a plurality of successively acting actuators for so moving said arm and for moving said arm and selected member to shift the speed gear as desired.

14. A speed changing and controlling device including in combination a plurality of members arranged side by side and separately movable to shift the transmission gears for different speeds, an arm movable into and out of engagement with a selected member, and guiding means and a plurality of fluid pressure operated actuators for so moving said arm and for moving said arm and selected member to shift the speed gear as desired.

15. A speed changing and controlling device including in combination a plurality of members arranged side by side and separately movable to shift the transmission gears for different speeds, an arm movable into and out of engagement with a selected member, and guiding means and a plurality of successively acting fluid pressure operated actuators for so moving said arm and for moving said arm and selected member to shift the speed gear as desired.

16. A speed changing and controlling device including in combination a plurality of members arranged together and having an initial position and being movable therefrom and thereto to shift the transmission gears for different speeds, an arm adapted to pass out of engagement with one and into engagement with another of said members at said initial position and adapted to move a desired one of said members from or to said initial position to shift the transmission gears and automatic means comprising a guiding device and a plurality of successively acting actuating devices controlling said arm for returning one of said members to the initial position and for passing to another member at such position and moving said last named member to effect a shift of the transmission gears.

17. A speed changing and controlling device including in combination a plurality of members arranged together and having an initial position and being movable therefrom and thereto to shift the transmission gears for different speeds, an arm adapted to pass out of engagement with one and into engagement with another of said members at said initial position and adapted to move a desired one of said members from or to said initial position to shift the transmission gears and automatic means comprising a guiding device and a plurality of successively acting fluid pressure operated actuating devices controlling said arm for returning one of said members to the initial position and for passing to another member at such position and moving said last named member to effect a shift of the transmission gears.

18. A speed changing and controlling device including in combination a plurality of members arranged together and having an initial position and being movable therefrom and thereto to shift the transmission gears for different speeds, an arm adapted to pass out of engagement with one and into engagement with another of said members at said initial position and adapted to move a desired one of said members from or to said initial posititon to shift the transmission gears, and automatic means controlling said arm for returning one of said members to the initial position and for passing to another member at such position and moving said last named member to effect a shift of the transmission gears, and a plurality of settable devices corresponding to the different speeds, each one adapted to be set to effect a shift to the corresponding speed.

19. A speed changing and controlling device including in combination a plurality of members arranged together and having an initial position and being movable therefrom and thereto to shift the transmission gears for different speeds, an arm adapted to pass out of engagement with one and into engagement with another of said members at said initial position and adapted to move a desired one of said members from or to said initial position to shift the transmission gears, and automatic means controlling said arm for returning one of said members to the initial position and for passing to another member at such position, and moving said last named member to effect a shift of the transmission gears, and a plurality of settable devices operating by fluid pressure and corresponding to the different speeds, each one adapted to be set to effect a shift to the corresponding speed.

20. A speed changing and controlling device including in combination a plurality of members arranged together and having an initial position and being movable therefrom and thereto to shift the transmission gears for different speeds, an arm adapted to pass out of engagement with one and into engagement with another of said members at said initial position and adapted to move a desired one of said members from or to said initial position to shift the transmission gears and automatic means comprising guiding and actuating devices controlling said arm for returning one of said members to the initial position and for passing to another member at such position and moving said last named member to effect a shift of the transmission gears, and a plurality of settable devices corresponding to the different speeds, each one adapted to be set to effect a shift to the corresponding speed.

21. A speed changing and controlling device including in combination a plurality of members arranged together and having an initial position and being movable therefrom and thereto to shift the transmission gears for different speeds, an arm adapted to pass out of engagement with one and into engagement with another of said members at said initial position and adapted to move a desired one of said members from or to said initial position to shift the transmission gears, and automatic means comprising a guiding device and a plurality of successively acting actuating devices controlling said arm for returning one of said members to the initial position and for passing to another member at such position and moving said last named member to effect a shift of the transmission gears, and a plurality of settable devices corresponding to the different speeds, each one adapted to be set to effect a shift to the corresponding speed.

22. A speed changing and controlling device including in combination a plurality of members arranged together and having an initial position and being movable therefrom and thereto to shift the transmission gears for different speeds, an arm adapted to pass out of engagement with one and into engagement with another of said members at said initial position and adapted to move a desired one of said members from or to said initial position to shift the transmission gears and automatic means comprising a guiding device and a plurality of successively acting fluid pressure operated actuating devices controlling said arm for returning one of said members to the initial position and for passing to another member at such position and moving said last named member to effect a shift of the transmission gears, and a plurality of settable devices operating by fluid pressure and corresponding to the different speeds, each one adapted to be set to effect a shift to the corresponding speed.

23. A speed changing and controlling device including in combination a plurality of members arranged side by side and separately movable to shift the transmission gears for different speeds, an arm movable into and out of engagement with a selected member, and stationary guiding means and a plurality of separately movable actuators for so moving said arm and for moving said arm and selected member to shift the speed gear as desired.

24. A speed changing and controlling device including in combination a plurality of members arranged side by side and separately movable to shift the transmission gears for different speeds, an arm movable into and out of engagement with a selected member, and stationary guiding means and a plurality of separately slidable movable actuators for so moving said arm and for moving said arm and selected member to shift the gear as desired.

25. A speed changing and controlling device including in combination a plurality of members arranged side by side and separately movable to shift the transmission gears for different speeds, an arm movable into and out of engagement with a selected member, and stationary guiding means and a plurality of separately fluid pressure operated actuators for so moving said arm and for moving said arm and selected member to shift the speed gear as desired.

26. A speed changing and controlling device including in combination a plurality of slidable rods arranged side by side and movable to shift the transmission gears for different speeds, a movable arm adapted to shift from one of said rods to another at an initial position and to move any desired rod to and from said initial position to shift the corresponding gear, a plurality of apertured slides through which said rod passes, an apertured stationary guide plate through which said rod also passes, a cylinder for each of said guide plates and having its piston connected to its guide plate, a series of valves corresponding to the different speeds and connections from each valve whereby the various pistons are successively actuated to cause said arm by the joint co-action of the guide plate and requisite slides to throw out one gear by moving its slidable rod, pass to another slidable rod and to throw in its gear by movement of such rod, said valves being also adapted to throw out the clutch before and to throw it in after such change in the gears.

27. A speed changing and controlling device including in combination a plurality of slidable rods arranged side by side and movable to shift the transmission gears for different speeds, a movable arm adapted to shift from one of said rods to another at an initial position and to move any desired rod to and from said initial position to shift the corresponding gear, a plurality of apertured slides through which said rod passes, an apertured stationary guide plate through which said rod also passes, a cylinder for each of said guide plates and having its piston connected to its guide plate, a series of valves corresponding to the different speeds and connections from each valve whereby the various pistons are successively placed under pressure and released therefrom before the next succeeding cylinder is placed under pressure to cause said arm by the joint coaction of the guide plate and requisite slides to throw out one gear by moving its slidable rod, pass to another slidable rod and to throw in its gear by movement of such rod, said valves being also adapted to throw out the clutch before and to throw it in after such change in the gears.

28. A speed changing and controlling device including in combination a plurality of gear shifting members arranged adjacent to each other, means for moving said members to throw out one gear and throw in another gear, a plurality of actuators therefor, and a plurality of cylinders for said actuating means, and means for supplying fluid pressure to one of said cylinders and then releasing said pressure, and thereafter supplying fluid pressure to another of said cylinders to cause said moving means to first move one of said gear shifting members and then another of said gear shifting members.

In testimony whereof, I have signed my name to this specification, in the presence of two subscribing witnesses.

ARTHUR SPEAR.

Witnesses:
JOHN D. MORGAN,
ROSE MEUK.